United States Patent
Hick

(10) Patent No.: US 10,136,493 B2
(45) Date of Patent: *Nov. 20, 2018

(54) BRIGHTNESS MONITORING FOR LED FAILURES AND DAYLIGHTING TARGET ADJUSTING

(71) Applicant: LEVITON MANUFACTURING CO., INC., Melville, NY (US)

(72) Inventor: Robert L. Hick, Newberg, OR (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,864

(22) Filed: Oct. 9, 2017

(65) Prior Publication Data

US 2018/0035508 A1    Feb. 1, 2018

Related U.S. Application Data

(62) Division of application No. 15/477,327, filed on Apr. 3, 2017, which is a division of application No. 15/132,624, filed on Apr. 19, 2016, now Pat. No. 9,648,697.

(51) Int. Cl.
| | |
|---|---|
| *H01J 1/60* | (2006.01) |
| *H01J 7/42* | (2006.01) |
| *H05B 37/04* | (2006.01) |
| *H05B 33/08* | (2006.01) |
| *H05B 37/02* | (2006.01) |

(52) U.S. Cl.
CPC ....... *H05B 33/0851* (2013.01); *H05B 33/089* (2013.01); *H05B 37/0272* (2013.01); *H05B 37/0281* (2013.01)

(58) Field of Classification Search
None
See application file for complete search history.

(56) References Cited

U.S. PATENT DOCUMENTS

| | | | |
|---|---|---|---|
| 7,535,375 B2 | 5/2009 | McDermott, Sr. | |
| 7,557,524 B2 | 7/2009 | Chevalier et al. | |
| 7,608,807 B2 | 10/2009 | Hick et al. | |
| 8,110,994 B2 | 2/2012 | Hick et al. | |
| 9,648,697 B1 * | 5/2017 | Hick ................. | H05B 37/0218 |
| 2004/0070520 A1 | 4/2004 | Sharp et al. | |
| 2013/0200807 A1 | 8/2013 | Mohan et al. | |
| 2014/0035465 A1 | 2/2014 | Raj et al. | |

(Continued)

*Primary Examiner* — Anh Tran

(57) ABSTRACT

A system monitors operational status of a lighting element. A lighting fixture processor instructs a lighting element to illuminate at a predetermined time, receives sensed light level information from the light sensing element, and transmits a message including information representing the sensed light level. A room controller can control some or all of these steps. A daylighting arrangement includes a room controller that instructs the lighting fixtures of a lighting group to illuminate their lighting elements at a predetermined time of day. Sensed light level information is obtained and transmitted to the room controller, which determines an initial daylighting target for the lighting fixture group based on an average of the sensed light level information. The room controller instructs the lighting fixtures to illuminate their respective lighting elements in accordance with the initial daylighting target.

15 Claims, 5 Drawing Sheets

(56) References Cited

U.S. PATENT DOCUMENTS

| | | |
|---|---|---|
| 2014/0191667 A1 | 7/2014 | Glandt |
| 2016/0095186 A1 | 3/2016 | Reed |
| 2016/0302279 A1 | 10/2016 | Pope et al. |

\* cited by examiner

BRIGHTNESS MONITORING FOR LED FAILURES AND DAYLIGHTING TARGET ADJUSTING

CROSS-REFERENCE TO RELATED APPLICATIONS

This application is a divisional of, claims the benefit of and priority to previously filed U.S. patent application Ser. No. 15/477,327 filed Apr. 3, 2017, entitled "Brightness Monitoring for LED Failures and Daylighting Target Adjusting," which is a divisional of, and claimed the benefit of and priority to previously filed U.S. patent application Ser. No. 15/132,624, now U.S. Pat. No. 9,648,697, filed Apr. 19, 2016, entitled "Brightness Monitoring for LED Failures and Daylighting Target Adjusting," which are hereby incorporated by reference in their entirety.

FIELD OF THE DISCLOSURE

The present disclosure relates generally to lighting control systems, and more particularly to an advanced system and method for monitoring lighting fixtures to detect failures and to adjust daylighting targets.

BACKGROUND OF THE DISCLOSURE

Light emitting diode (LED) lighting fixtures are becoming increasingly popular due to their advantages over lighting fixtures that employ other lighting technologies such as fluorescent and incandescent bulbs. LED lighting fixtures excel in energy consumption efficiency, reliability, and length of lifetime compared to fluorescent and incandescent technologies. Additional advantages of LED lighting fixtures, when compared specifically to fluorescent lighting fixtures, include the ability to turn on instantly. Moreover, the lifetime of an LED lighting fixture is unaffected by cycling on and off, such as when powered on and off during normal usage.

LED fixtures often include a plurality of individual LED elements mounted on a substrate, with the combined output of the individual LED elements providing a desired brightness and/or color of light. One issue relating to such lighting fixtures is that when one or more of the individual LED elements fail, unwanted changes can occur to the overall brightness and/or color of the light emitted from the fixture. Such changes may or may not be easily observable by the naked eye, making physical inspection difficult.

In view of this, attempts have been made to automatically detect when an individual LED element or a lighting fixture has failed or is failing. In some systems it is common to add circuitry to a device that is providing power to the lighting fixture to measure the power used. In the case of a single lighting fixture, if the power/current is zero, it can be assumed that the lighting fixture has failed. In the case where the device is powering multiple lighting fixtures, if the power/current is observed to drop significantly it can be inferred that at least one lighting fixture has failed.

In the case of LEDs, failure typically results in the loss of light intensity (including complete failure in which no light is emitted), but with continued current draw. For this reason, failure detection techniques that employ power monitoring are not effective in determining LED failures. Thus, testing and troubleshooting fixtures in an LED lighting control network can be time consuming, often involving a significant amount of manual labor. Commissioning agents often need to identify the fixture(s) in a specific room using building layout documents, and then may need to walk to the room and troubleshoot each lighting fixture in that room. Adding to the complexity is that master (central) controllers used in such systems are often located in electrical closets or behind ceilings, and it may be necessary to connect a user input to the master controller which, in turn, requires accessing and opening the master controller to connect the user input thereto.

In addition to the aforementioned problems, when LED lighting fixtures (or individual LED elements) fail, it can impact daylighting functionality of the associated lighting system. Since daylighting levels for a particular space are often set once (e.g., when the lighting system for a room is initially installed), failure of one or more LED lighting fixtures in a room can adversely affect lighting levels in the room throughout the day.

In view of these deficiencies in current systems, it would be desirable to provide a system and method for monitoring one or more LED lighting fixtures to automatically determine when intensity changes occur so that replacement or repair can be performed quickly and efficiently. In addition, it would be desirable for such a system and method to identify the individual LED lighting fixture that is affected so that a maintenance operations can be directed to the specific fixture, eliminating the need for room walk-throughs. Further, it would be desirable for the system and method to automatically adjust daylighting levels when an LED lighting failure is detected, and to readjust daylighting levels once the affected LED lighting fixture is repaired.

SUMMARY OF THE DISCLOSURE

A system is disclosed for monitoring operational status of a lighting element. The system may include a lighting fixture including a housing, a lighting element and a lighting fixture transceiver. The lighting element and the lighting fixture transceiver may be disposed within the housing. A light sensing element may be provided, and a processor communicatively coupled to the lighting fixture and the light sensing element. The processor may be programmed to: instruct the lighting element to illuminate at a predetermined time; receive sensed light level information, where said sensed light level information represents information obtained by the light sensing element while the lighting element is illuminated, and said sensed light level information comprises a sensed light level value; compare the sensed light level value to a predetermined light level value and; transmit an alert when the sensed light level value deviates from the predetermined light level value by a predetermined amount.

A system is disclosed for adjusting a daylighting target for a lighting arrangement. The system may include a lighting fixture group comprising a plurality of lighting fixtures. Each of the lighting fixtures in the lighting fixture group may comprise a housing, a lighting element, a light sensing element, a lighting fixture processor and a lighting fixture transceiver disposed within the housing. A room controller may have a first processor and a first transceiver. The first processor may be programmed to: instruct, via the first transceiver, each of the plurality of lighting fixture processors to: illuminate their lighting elements at a predetermined time of day; receive sensed light level information from their light sensing elements while their lighting elements are illuminated; and transmit, via the lighting fixture transceiver, respective wireless messages including information representing the sensed light level. The first processor may further be programmed to receive, via the first transceiver, the respective wireless messages and to determine a daylighting target for the lighting fixture group based on an average of the sensed light level information, and instruct, via the first transceiver, the plurality of lighting fixture processors to illuminate their respective lighting elements in accordance with the daylighting target.

A method is disclosed for monitoring operational status of a lighting element of a lighting fixture. The method may include: instructing, from a processor, a lighting element to illuminate at a predetermined time; receiving, at the processor, sensed light level information, said sensed light level information representing information obtained by the light sensing element while the lighting element is illuminated, said sensed light level information comprising a sensed light level value; comparing the sensed light level value to a predetermined light level value; and transmitting an alert when the sensed light level value deviates from the predetermined light level value by a predetermined amount.

A method is disclosed for adjusting a daylighting target for a group of lighting fixtures, each of the lighting fixtures including a fixture processor, a lighting element, a light sensing element, and a fixture transceiver. The method may include: instructing, from a first transceiver of a room controller, the plurality of lighting fixtures to, one at a time: illuminate their lighting elements at a predetermined time of day; receive sensed light level information from their light sensing elements while their lighting elements are illuminated; and transmit, via their lighting fixture transceivers, respective wireless messages including information representing the sensed light level. The method may further include receiving, via the first transceiver, the respective wireless messages; averaging, by a first processor associated with the room controller, the sensed light level information received from the plurality of lighting fixtures; determining a daylighting target for the lighting fixture group based on the average; and instructing, via the first transceiver, the plurality of lighting fixture processors to illuminate their respective lighting elements in accordance with the daylighting target.

BRIEF DESCRIPTION OF THE DRAWINGS

By way of example, a specific embodiment of the disclosed invention will now be described, with reference to the accompanying drawings, in which.

DETAILED DESCRIPTION

Figure 1:
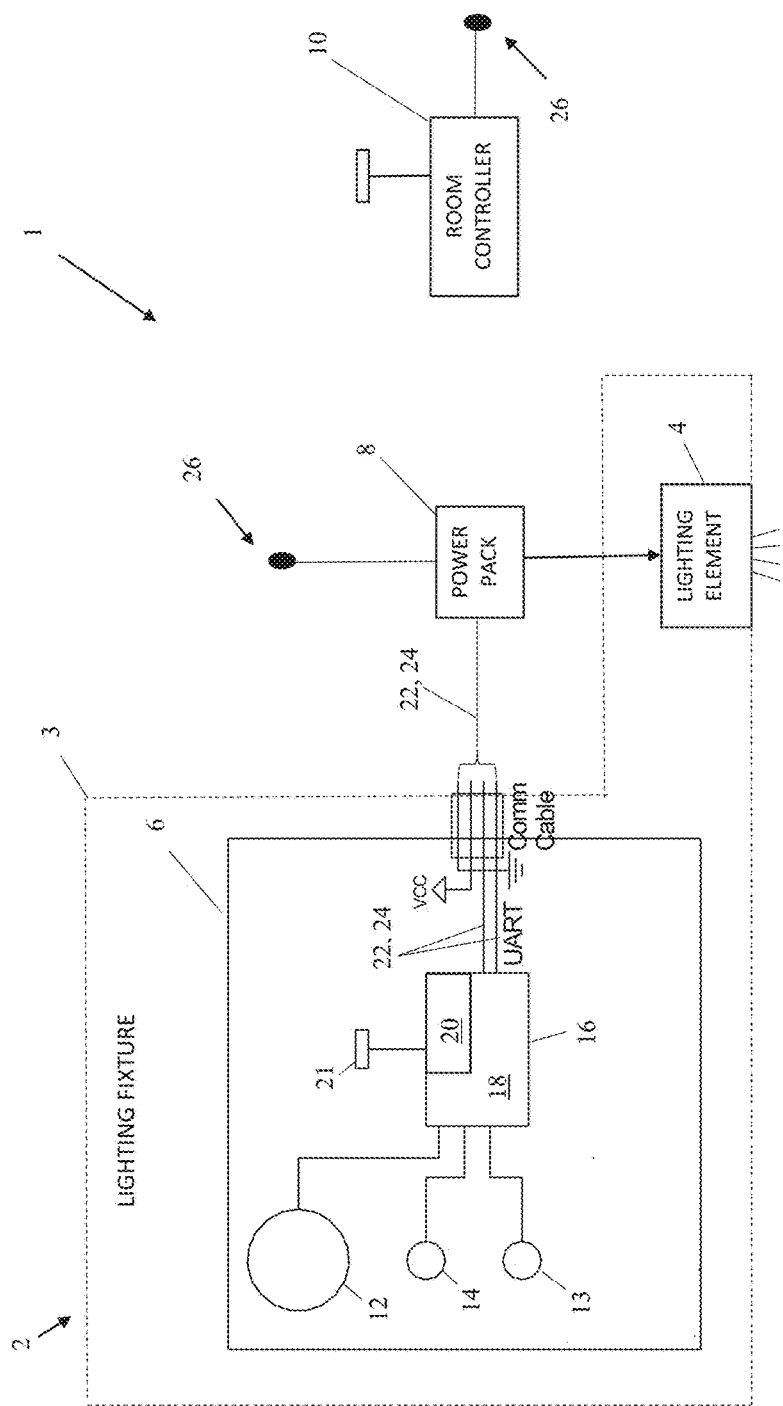
FIG. 1 is a schematic diagram of an exemplary lighting system according to a first preferred embodiment of the disclosure.

The disclosure provides systems and methods for using a light sensing element associated with an LED lighting fixture to monitor the fixture's light output and determine if a failure has occurred or is about to occur, and/or if a daylighting target should be adjusted. Preferably, the light sensing element is integrated into the LED lighting fixture.

In one embodiment an LED lighting fixture or system may include an occupancy sensor, a light sensor such as a photocell, and a plurality of LED elements. The amount of light output by the plurality of LED elements can be measured by the light sensor when the lighting fixture is initially installed. A reference value for this initial measurement may be recorded and saved in memory. Thereafter, the light sensor may periodically measure the amount of light output by the LED element, and the periodic measurements can be compared against the reference value to detect changes which may be indicative of a failure or failing condition of one or more of the plurality of LED elements.

In another embodiment, a lighting control system may include a room controller and a plurality of LED lighting fixtures, whereby each fixture is integrated or associated with a power pack module and a sensor and control module. For example, the sensor and control module and the power pack module may be integrated into the housing of the fixture. This may be particularly useful where the fixture is a troffer or linear fixture. Alternatively, the sensor and control module may be mounted in the ceiling (e.g., a drop ceiling) alongside the fixture, while the power pack may be integrated into or associated with the fixture above the ceiling (e.g., the power pack may be mounted to an existing electrical box via a knock out). This may be particularly useful where the fixture is a recessed lighting fixture. Communications between the sensor and control module and the power pack may be via a serial cable.

As will be described herein, in use, the room controller may be incorporated into an entry station that includes one or more user accessible interfaces (e.g., buttons, slides, etc.) for receiving user instructions. Alternatively, the room controller and the entry station may be located in separate and distinct housings. For example, the entry station may be located adjacent an entrance to a room while the room controller may be located within the ceiling or wall.

As will be described herein, in use, each lighting fixture may include an occupancy sensor and a light sensing element for collecting information on the room's occupancy and light levels, respectively. The light sensing element may also collect information about light levels emitted from one or more LED elements of the lighting fixture. This information may be transmitted to, or otherwise obtained by, the sensor and control module. Using a processor and a transceiver located in the sensor and control module, the information can be transmitted to the room controller. In some embodiments the room controller may be responsible for collecting all sensor information from a group of lighting fixtures associated therewith (e.g., a plurality of lighting fixtures located in one or more rooms of a building) and for commanding one or more functions of the lighting fixtures in the group.

Referring now to FIG. 1, an embodiment of the disclosed lighting system 1 includes a lighting fixture 2 having a housing 3 within which may be disposed a lighting element 4 and a sensor and control module 6. In some embodiments the lighting element 4 comprises a light emitting diode (LED) element. In other embodiments the lighting element 4 includes a plurality of individual LED elements. The system 1 may also include a power pack 8 and a room controller 10. The sensor and control module 6 may include an occupancy sensing element 12, a status indicator 13 such as an LED, a light sensing element 14 such as a photocell, and a communications module 16, which may include a wireless communications module/chip. The communications module 16 may include a fixture processor 18 and a fixture transceiver 20. Though the fixture processor 18 and fixture transceiver 20 are shown and described as separate elements, they may be integrated, for example, onto a single mpu or chip. In alternate embodiments, a separate transceiver can be used in place of the fixture transceiver 20.

The power pack 8 may be coupled to the sensor and control module 6 via one or more power and communications cables 22, 24 so that the power pack 8 can supply power to the sensor and control module 6 (via the power cable) and so that the sensor and control module 6 can command operation of the power pack 8 (via the communications cable). In some embodiments the communication cable is a simple universal asynchronous receiver/transmitter (UART) connection for messaging between the sensor and control module 6 and the power pack 8. In the illustrated embodiment, the power pack 8 is disposed outside of the housing 3 of the lighting fixture 2. It will be appreciated, however, that embodiments are contemplated in which the power pack 8 is integrated into the housing 3. Alternatively, it will be appreciated that although the sensor and control module 6 is coupled to the lighting element 4 via power pack 8, in various embodiments communications between the sensor and control module 6 and the lighting element 4 may be direct, without the intervening power pack. For example, the sensor and control module may communicate directly with the lighting element driver. Alternatively, the sensor and control module may communicate directly with the lighting element. For example, the lighting element may be a COB and the sensor and control module may communicate directly with the COB via an applicable communication protocol (e.g., DMX). Communicating directly with the lighting element or its associated driver eliminates the need for the intervening relay or power pack.

The power pack 8 may be coupled to the lighting fixture 2. In addition, the power pack 8 is often coupled to a source of power (e.g., line power) 26 so that the lighting element 4 may be selectively illuminated. For example, the lighting element 4 may be selectively illuminated in response to an occupancy condition sensed by the occupancy sensing element 12 or a command from the room controller 10. The power pack 8 may provide relay switched power for turning the lighting fixture ON and OFF, along with 1-10 Vdc dimmer control for dimming the lights UP and DOWN.

The fixture transceiver 20 may be coupled to an antenna 21 and may use any of a variety of suitable wireless transmission technologies including RF transmission using one of the many standards developed by the Institute of Electrical and Electronic Engineers (IEEE), infrared transmission using a standard from the Infrared Data Association (IrDA), or any other standardized and/or proprietary wireless communication technology. A non-limiting exemplary listing of appropriate wireless transmission technologies include ZigBee, Bluetooth, Wi-Fi, 802.15.4, near field communication (NFC), Z-wave.

The fixture processor 18 may be communicatively coupled to each of the individual components of the sensor and control module 6 to control one or more operational aspects of the lighting control system 1. For example, the fixture processor 18 can be communicatively coupled to the occupancy sensing element 12, the status indicator 13 and the light sensing element 14 so that the fixture processor 18 can receive occupancy detection and light level information. The fixture processor 18 also may receive and process incoming wireless messages via the fixture transceiver 20 and may command the transmission of outgoing wireless messages via the fixture transceiver 20. In one particular embodiment, the fixture processor 18 is configured to: (i) receive occupancy and ambient light level information from the occupancy sensing element 12 and light sensing element 14, respectively; (ii) manage the transmission of occupancy and ambient light level information to the room controller 10; (iii) receive messages from the room controller 10; and (iv) transmit operational command signals to the power pack 8 to control the lighting element 4. In other embodiments, the fixture processor may send a wireless message to a communicatively coupled entry station, room controller 10 or other wireless lighting fixture, based on an occupancy condition sensed by the occupancy sensing element 12.

In one non-limiting exemplary embodiment, the communications module 16 includes a ZigBee radio. The communications module 16 may be configured to manage the occupancy and light sensing elements 12, 14 and for transmitting sensor status to the room controller 10 and for receiving commands from the room controller 10. A non-limiting example of an appropriate communications module 16 is a Silicon Labs ZigBee system on a chip (SOC) EM3581-RT. The EM3581-RT is a fully integrated SOC that integrates a 2.4 GHz, IEEE 802.15.4-2003-complaint transceiver, a microprocessor, flash and RAM memory.

It will be appreciated that although the lighting fixture 2 is disclosed as communicating with the room controller 10 via a wireless communication link, in some embodiments the lighting fixture may communicate with the room controller via a hard wired digital connection such as Ethernet, Power over Ethernet, RS485, CAN, or the like.

The occupancy sensing element 12 may employ any of a variety of sensing technologies, including passive infrared (PIR), ultrasound (U/S), audio, video, microwave, and the like (or a combination thereof). In one non-limiting exemplary embodiment the occupancy sensing element 12 is a digital PPR sensor. The light sensing element 14 may, in one non-limiting exemplary embodiment, be a 0-10V digital photosensor. The lighting fixture 2 may be a troffer, a linear fixture, a pendant, a recessed fixture, a wall wash, or the like. As previously noted, the lighting element 4 may comprise at least one LED.

Figure 2:
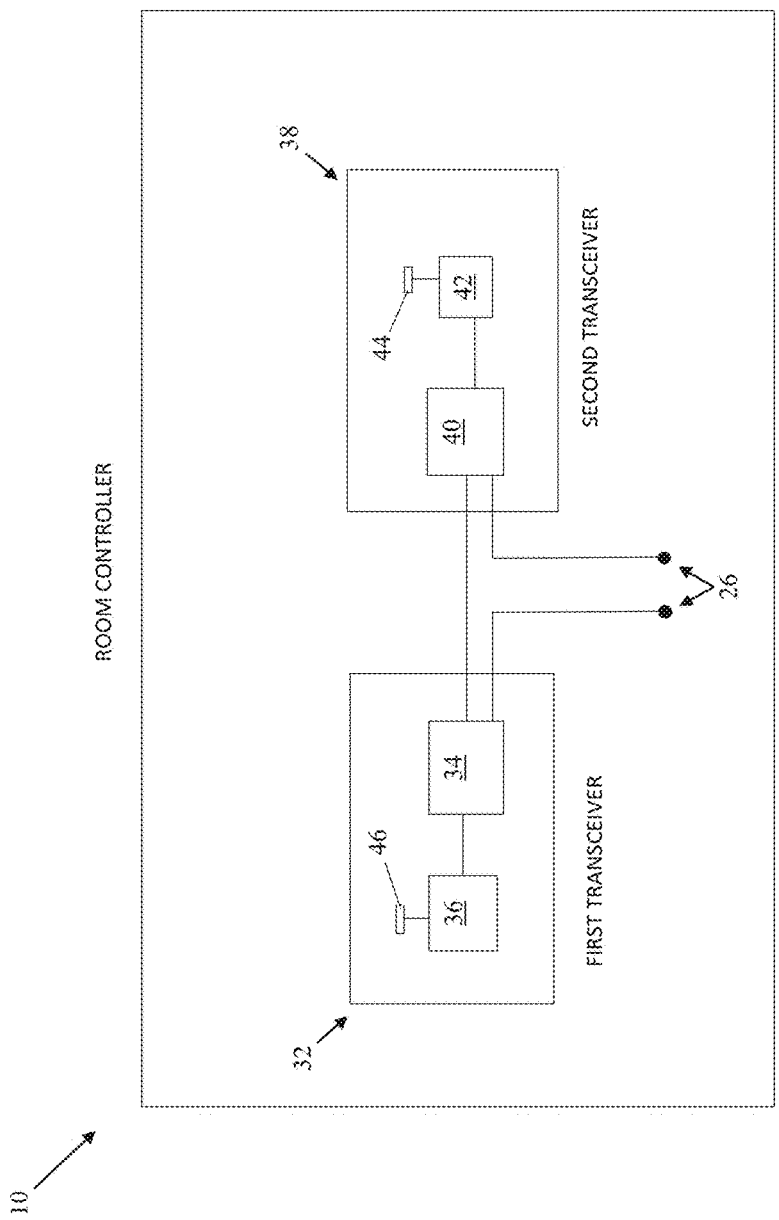
FIG. 2 is a schematic diagram showing the placement and structure of an exemplary entry station according to the lighting system of FIG. 1.

As shown in FIG. 2, and as previously described, the room controller 10 may include a first transceiver 32 which may, in one non-limiting exemplary embodiment, may be a ZigBee radio. A non-limiting example of an appropriate first transceiver 32 is Silicon Labs' model EM358x-RT. In the illustrated embodiment and as previously mentioned herein, the room controller 10 can be embodied in a line powered entry station, though it will be appreciated that other embodiments can include a separate room controller. It will be appreciated that although the processor is coupled to the AC source of line power 26, in practical application AC power would not be applied directly to the low voltage components of the room controller 10. Rather, and for example, at least an AC-DC converter would be coupled between the source of line power 26 and the first processor 34.

The first transceiver 32 may include a first processor 34, a first transceiver portion 36, and a first antenna 46. The first transceiver portion 36 may be communicatively coupled to the first processor 34. Though the first transceiver portion 36 and first processor 34 are shown and described as separate elements, they may be integrated, for example, on a single chip. Non-volatile memory may be associated with the first processor 34.

The room controller 10 may include a second wireless transceiver 38, which in one non-limiting exemplary embodiment is a Bluetooth transceiver, and more preferably BLE. The second transceiver 38 may be used to communicate with a remote device such as a smartphone, smart tablet, laptop, or other computing device running a custom application ("App") which can facilitate commissioning, monitoring, remote control and application code updates. An example of an appropriate second transceiver 38 is a Texas Instruments BLE chip, such as model TI CC2541 or CC2640. The second transceiver 38 may include a second processor 40, and may have a second transceiver portion 42 with a second antenna 44 that is separate from the first antenna 46 of the first transceiver 32. In other embodiments the first transceiver 32 and the second transceiver 38 may share a single antenna. Though the second transceiver portion 42 and the second processor 40 are shown and described as separate elements, they may be integrated, for example, on a single chip. Non-volatile (or other suitable) memory may be associated with the second processor.

The first and second processors 34, 40 may be coupled in a manner that enables them to intercommunicate with each other. A wired communication coupling is shown, but this is not limiting. As will be appreciated, such intercommunication can allow information to be passed through the system 1 in an efficient manner. For example, a user may, with a remote device (e.g., smartphone, smart tablet, laptop, etc.) transmit receive information (e.g., light level information) from the second transceiver 38 and second processor 40 via Bluetooth.

As previously mentioned, the disclosed system and method enable a lighting fixture 2 to automatically measure the illumination level of its lighting element 4 to confirm that the lighting element 4 is operating above a predetermined illumination level, and to alert an operator if the lighting element 4 is determined to be operating below the predetermined illumination level.

In order to determine whether the lighting element 4 of a particular lighting fixture 2 is providing a desired level of illumination, an initial illumination measurement may be obtained. In some embodiments, the initial illumination measurement is preferably obtained shortly after the lighting fixture 2 is initially installed in a targeted space. The initial illumination measurement may be obtained by any means now known or hereafter developed. For example, the initial illumination measurement may be obtained using the light sensing element 14 integrated into or associated with the lighting fixture 2 that contains the lighting element 4. In some embodiments the fixture processor 18 may be programmed to obtain this initial illumination measurement. Alternatively, the initial illumination measurement may be commanded by the first processor 34 of the room controller 10. Where the initial illumination measurement is commanded by the first processor 34 of the room controller 10, a wireless message may be sent from the first processor 34 of the room controller 10 to the fixture processor 18 via the first transceiver 36 and the fixture transceiver 20, whereupon the fixture processor 18 may obtain the initial illumination measurement. In still further embodiments, the first processor 34 may be commanded to obtain the initial illumination measurement by an operator using a remote device. In such cases an instruction from the remote device may be received at the room controller 10 via the second transceiver 38.

In one non-limiting exemplary embodiment, the initial illumination measurement may be obtained by the fixture processor 18 commanding the lighting element 4 to illuminate. While the lighting element 4 is illuminated, the fixture processor 18 may obtain a measurement of the light outputted by the lighting element 4 from the light sensing element 14. The fixture processor 18 may store this measurement in non-volatile memory associated with the fixture processor 18. Alternatively, or in addition, the fixture processor 18 may transmit the measurement to the first processor 34 via the fixture transceiver 20 and the first transceiver 36. The first processor 34 of the room controller 10 may then store this measurement in associated non-volatile memory. In some embodiments the initial illumination measurement information may also be provided to a remote device via the second transceiver 38 of the room controller 10.

In order to maximize the accuracy of the initial illumination measurement, the initial measurement may be obtained at a time of day when there is little, if any, external light. In this way, all of the light sensed by the lighting sensing element 14 can be assumed to be attributed to the lighting element 4 of the lighting fixture 2 under observation. Thus, in some embodiments the initial measurement may be taken during periods of minimal daylight contribution and no space utilization (e.g., nighttime, after working hours). In one non-limiting exemplary embodiment, the initial measurement may take about 5 seconds per lighting fixture.

It will be appreciated that although the disclosed systems and methods are being discussed in relation to the lighting fixture 2 and room controller 10 of FIGS. 1 and 2, the disclosed systems and methods can be applied equally to systems in which the occupancy sensing element 12 and light sensing element 14 are not located within the housing of the lighting fixture 2, but instead are located in the room with the lighting fixture.

Figure 3:
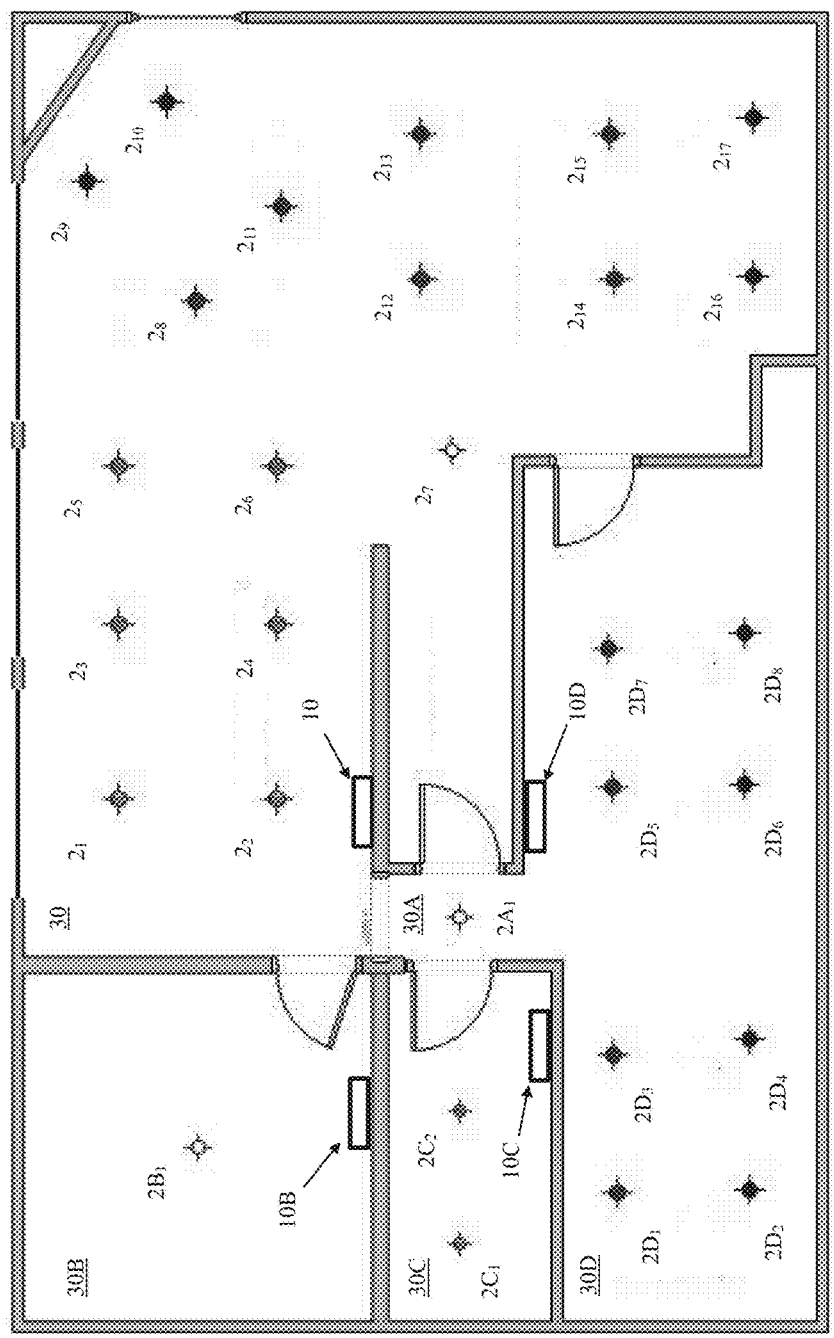
FIG. 3 is a plan view of an exemplary layout of lighting fixtures in multiple rooms of a building.

Referring to FIG. 3, a particular room may include a plurality of individual lighting fixtures 2. Thus, to maximize the accuracy of the initial illumination measurement for each fixture, it may be advantageous to obtain the measurements individually (e.g., fixture by fixture), to ensure that the light sensed by the light sensing element 14 of each fixture can be assumed to be attributed to the lighting element 4 of a single lighting fixture. Thus, in some embodiments the first processor 34 located in the room controller 10 may schedule each lighting fixture 2 associated therewith to obtain an initial illumination measurement for its lighting element 4 at a different discrete time. In one non-limiting exemplary embodiment, the lighting fixtures 2 may be instructed, one by one, by the first processor 34 of the room controller 10 to cycle their lighting elements 4 and obtain the initial illumination measurements using their respective light sensing elements 14.

Alternatively, one or more manual techniques may be used to obtain the initial illumination measurements. For example, the lighting fixtures 2 may be provided with a dip switch, toggle or other manual input mechanism which, when actuated, may initiate the illumination and measurement sequence described above for each lighting fixture 2. In other embodiments the illumination and measurement sequence can be initiated via wireless communication with a remote device, such as a smartphone, smart tablet, laptop, or the like. In such cases the fixture processor 18 may be programmed to run a routine that, when initiated by the manual input, turns on the lighting element 4 of the lighting fixture 2, and obtains the initial illumination measurement from the light sensing element 14 and stores that information in non-volatile memory associated with the fixture processor 18. The fixture processor 18 may then turn off the lighting element 4. The operator may go to each lighting fixture 2 in a particular room, obtaining the initial illumination measurements in a sequential manner. Alternatively, an operator may only actuate a first lighting fixture 2 in a particular room to start the process. Once that first lighting fixture 2 has obtained the initial illumination measurement from its light sensing element 14 and stored that information in non-volatile memory associated with the fixture processor 18, the first lighting fixture may then instruct a next closest lighting fixture 2 to do the same. An appropriate wireless instruction message may be sent and received via the communications modules 16 of the associated lighting fixtures. In response to the received instruction, the next closest lighting fixture may then turn on its lighting element 4, obtain an initial illumination measure from its light sensing element 14, and store that information in non-volatile memory associated with its fixture processor 18. The process may continue, with each lighting fixture 2 instructing a next lighting fixture to obtain initial illumination measurements until measurements have been obtained for all of the lighting fixtures in the room.

In some embodiments the fixture processors 18 may transmit the initial illumination measurements to the first processor 34 of the room controller 10 via the fixture transceiver 20 and the first transceiver 36. The initial illumination measurements may be stored in non-volatile memory associated with the first processor 34 and/or they may be provided to a remote device via the second transceiver 38.

Once the initial illumination measurement has been obtained for the lighting element 4 of a lighting fixture 2, the measurement can then be used as a baseline against which to determine future performance of the lighting element 4. In some embodiments, each lighting fixture 2 may be periodically tested to determine whether the lighting element 4 associated with the lighting fixture 2 is providing a desired level of illumination. For example, periodic illumination measurements can be obtained for the lighting element 4 of each lighting fixture 2 by periodically commanding the lighting element 4 on, and obtaining a measurement of the outputted light using the lighting fixture's light sensing element 14. The periodic illumination measurements may be compared to the initial illumination measurement to determine whether the lighting fixture is operating above a desired level. These periodic illumination measurements can be obtained daily, weekly, monthly, quarterly, or the like based on the clock associated with the lighting fixture or the room controller.

In one embodiment these periodic illumination measurements may be performed under lighting conditions similar to those under which the initial illumination measurement was obtained. The periodic illumination measurements may be compared to the initial illumination measurement for that lighting fixture 2, and where the difference between the initial illumination measurement and a periodic illumination measurement is greater than a predetermined threshold amount, appropriate action may be taken. In one non-limiting exemplary embodiment, where a comparison of the periodic and initial illumination measurements indicates the lighting element 4 has undergone a reduction in illumination of more than 10%, an alert may be provided to a user so that an operator may repair or replace the lighting fixture 2 or the lighting element 4. Examples of such alerts will be described in greater detail below.

The comparison between the initial illumination measurement and the periodic illumination measurement may be performed by any processor associated with the system. For example, the comparison between the initial illumination measurement and the periodic illumination measurement may be performed by the fixture processor 18. In other embodiments the comparison may be performed by the first processor 34 located in the room controller 10. Still further, the comparison may be performed by a processor associated with a remote device which is communicatively coupled to the room controller 10, for example, via the second transceiver 38. The periodic illumination measurements can be stored in the non-volatile memory associated with the processor used, such as the fixture processor 18, the first processor 34, both, etc. The stored illumination measurements can, in some embodiments, be used to develop trending information. For example, the stored illumination measurements can be used to predict when a particular lighting element 4 may be expected to fail (i.e., drop below the predetermined threshold amount) so that repair or replacement of the lighting element 4 or lighting fixture 2 may be performed before failure occurs.

For embodiments in which the fixture processor 18 performs the comparison between the initial illumination measurement and the periodic illumination measurement (and where the comparison indicates the lighting element 4 has undergone a reduction in illumination of more than a predetermined amount), an alert may be transmitted. The alert may comprise a wireless message transmitted from the fixture processor 18 to the first processor 34 via the fixture transceiver 20 and first transceiver 36. In some embodiments the first processor 34 may then send a wired or wireless message to an operator using a remote device, via the second transceiver 38. The alert may include information sufficient to identify the individual lighting fixture 2 to which the alert applies. In some embodiments the alert may include additional information such as an indication that the lighting element 4 of a particular lighting fixture 2 is approaching the predetermined threshold amount so that preventive maintenance of the fixture can be performed before the fixture exceeds the predetermined threshold amount. In some embodiments the alert can be a physical indicator disposed on the affected lighting fixture 2, such as illuminating the fixture's status indicator 13.

In addition to determining whether the lighting elements 4 of individual lighting fixtures 2 are providing a desired level of illumination, the disclosed systems and methods may be used to set, adjust and reset daylighting levels for a particular space.

Referring now to FIG. 3, an exemplary layout of a plurality of lighting fixtures 2 within a floor of a building is shown. In this non-limiting exemplary embodiment, a plurality of spaces 30, 30A, 30B, 30C, 30D each include one or more installed lighting fixtures $2_{1-n}$, $2A_{1-n}$, $2B_{1-n}$, $2C_{1-n}$, $2D_{1-n}$ and a designated room controller 10, 10B, 10C, 10D (with the exception of the light $2A_1$ in room 30A, which may be controlled by room controller of an adjacent room). It will be appreciated that, in the context of the disclosure, the room controller 10 (10B, 10C, 10D) can in some embodiments be a larger area controller (e.g., controlling the lighting fixtures in several rooms), or it may be a central controller for a building of which the rooms are a part. As can be seen, certain of the lighting fixtures $2_1$, $2_3$, $2_5$, $2_9$, $2_{10}$ in one of the rooms 30 are located near a set of windows, while other of the lighting fixtures in the room are located further away from the windows. As will now be described, certain of the lighting fixtures in one or more of the spaces may have a daylighting algorithm applied thereto.

Daylighting (often referred to as daylight harvesting) involves the operation of lighting fixtures at reduced levels to provide, in combination with natural daylight, a minimum desired level of ambient lighting for an occupied space. Thus, during daylight hours, certain of the lighting fixtures in a space may be operated at a reduced illumination level when natural sunlight provides a portion of the total illumination required for a space. In the evening, when natural sunlight no longer contributes to the illumination of the space, the lighting fixtures may be operated at a higher illumination level, since they may be the sole source of illumination required for the space.

Daylighting calibrations typically assume that the involved lighting fixtures 2 are capable of operating at the illumination levels associated with the initial illumination measurement. Thus, when one or more of the lighting fixtures 2 emits a reduced level of light because one or more of its individual LED elements has failed or is failing, or due to a change in the room environment (e.g., if the furniture is moved or changed or if new carpet of a different brightness is installed), insufficient light may be provided to the space during daytime hours. To counter the effects of one or more underperforming lighting fixtures 2, an automatic daylighting calibration technique can be implemented to set, adjust, and reset daylighting levels to accommodate changes in illumination that can be caused by failed or failing lighting elements, changes to the room environment, or repairs or other changes to lighting elements in the room.

In some embodiments, an initial daylighting target may be obtained. Thereafter, periodic measurements may be obtained from the light sensing elements 14 of a group of lighting fixtures 2 to confirm whether the daylighting target should be adjusted. The initial daylighting target can be determined when the system is first installed. Exemplary methods for determining an initial daylighting target, and operating according to such a daylighting target, are disclosed in U.S. Pat. No. 7,608,807 to Hick et al., and U.S. Pat. No. 8,227,731 to Hick et al., the entirety of which patents are incorporated by reference herein. The periodic measurements can be performed manually or automatically according to any desired period scheme. Automatic recalibration can also be scheduled when a change in measured illumination from one or more lighting elements 4 in a group is determined to exceed a predetermined threshold, as previously described. Automatic recalibration can also occur on a periodic basis such as monthly, quarterly, semi-annually, annually, or any other desired period.

In one embodiment, initial daylighting calibration may be performed at the same general time of day as the initial illumination measurements are obtained (e.g., nighttime, when the space is not being used). In one non-limiting exemplary embodiment, the room controller 10 may command a group of designated lighting fixtures 2 to turn on and off together. A lighting group may consist of lighting fixtures 2 positioned adjacent to a set of exterior windows, such as lighting fixtures $2_1$-$2_{13}$ of room 30 (FIG. 3). The fixture processors 18 of each lighting fixture in the lighting fixture group may receive the command from the room controller 10, and in turn may command the lighting elements 4 to illuminate. The fixture processors 18 may then obtain measurements of the light outputted by the lighting element(s) using their associated light sensing elements 14. The fixture processors 18 may store this measurement in non-volatile memory associated with the fixture processor. Alternatively, or in addition, the fixture processor 18 may transmit the measurement to the room controller's first processor 34 via the fixture transceiver 20 and the first transceiver 36. The first processor 34 may store this measurement in associated non-volatile memory.

The first processor 34 of the room controller 10 may then take an average of the illumination measurement information received from each of the grouped lighting fixtures 2, and may use the average value to determine an initial daylighting target level. The average value would also be stored in non-volatile memory associated with the fixture processor 18, the first processor 34 of the room controller 10 and/or a remote device. As will be appreciated, during the daytime, a certain portion of that daylighting target level will be contributed by natural sunlight, and thus, the light provided by the individual lighting elements 4 of the grouped lighting fixtures 2 will be reduced as compared to their full brightness.

As will be appreciated, changes in illumination from one or more lighting elements 4 in a group can affect the daylighting target level for the lighting group (and as mentioned, changes in room layout, furniture and carpet selection can also affect the target level). To address such changes, periodic recalibration of the daylighting target level can be performed. The recalibration may be performed in a manual or automatic fashion. Manual recalibration may be initiated by an operator manually activating a dip switch, toggle or other manual input mechanism which signals the fixture processor 18 to begin a calibration process. In other embodiments the manual recalibration can be initiated by via wireless communication with a remote device, such as a smartphone, smart tablet, laptop, or the like. Automatic recalibration may be initiated by the fixture processor 18, the first processor 34 of the room controller 10, or by a remote device via the room processor's second transceiver 38. Automatic recalibration can be performed on a purely periodic basis (e.g., daily or monthly based on the clock associated with the lighting fixture or the room controller), or it can be event driven. For example, automatic recalibration may be scheduled when the comparison between the initial illumination measurement and the periodic illumination measurement for a particular lighting fixture 2 in a lighting group indicates the lighting element 4 has undergone a reduction in illumination of more than a predetermined amount. Such scheduling may include re-calibrating the daylighting target level (using the previously described technique) at the same general time of day as the initial illumination measurements are obtained (e.g., nighttime, when the space is not being used).

The periodic re-calibration technique may be identical to the technique used to determine the initial daylighting target level, and changes to the average illumination value may be used in lieu of the initially determined average value in order to set the recalibrated daylighting target level.

As will be appreciated, implementing the disclosed recalibration technique may enable daylighting levels to be automatically adjusted to accommodate for changes in the space environment. Such changes can include reduced illumination levels from one or more lighting fixtures 2 in the space (e.g., when one or more fixtures fails or is failing), as well as increased illumination levels from one or more lighting fixtures 2 in the space (e.g., when one or more fixtures are repaired).

In use, shortly after installation, an initial light level value of the lighting fixture is preferably obtained by the light sensing element and stored in memory. Thereafter, periodically, the lighting fixture is instructed to illuminate. More preferably, the lighting fixture is instructed to illuminate at night time when the amount of natural light is expected to be minimal at best. Each time the lighting fixture is instructed to be illuminated, the light sensing element measures the amount of light. The measured or sensed amount of light is stored in memory. The sensed light level value is compared to the initial light level value. If the sensed light level value deviates from the initial light level value by a predetermined amount, an alert is transmitted. The alert may be transmitted to a remote device via a wireless communication link or a hard wired connection such as Ethernet, Power over Ethernet, RS485, CAN, or the like.

Figure 4:
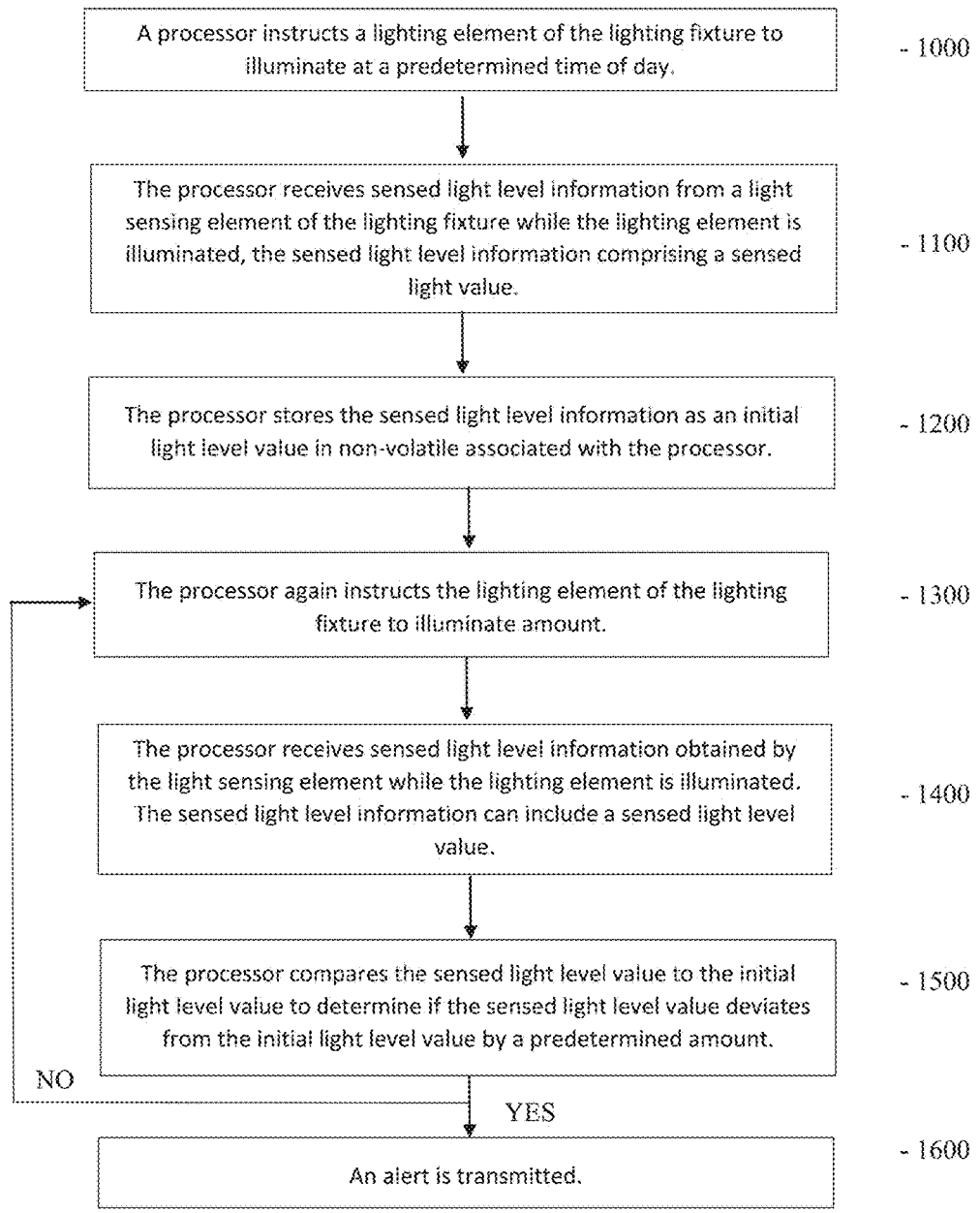
FIG. 4 is a logic diagram illustrating a first preferred embodiment of the disclosed method.

Referring now to FIG. 4, a logic diagram illustrates a first embodiment of the disclosed method. At 1000, a processor instructs a lighting element of the lighting fixture to illuminate at a predetermined time of day, preferably at nighttime when no natural light is expected. In some embodiments the processor is a lighting fixture processor disposed within a housing of the lighting fixture. In other embodiments the processor is a room controller processor that is communicatively coupled, via a lighting fixture processor, to the lighting fixture. At 1100, the processor receives sensed light level information. The sensed light level information can represent information obtained by the light sensing element while the lighting element is illuminated, and can include a sensed light level value. In some embodiments the light sensing element is part of the lighting fixture, while in other embodiments the light sensing element is not part of the lighting fixture but instead is disposed within the room in which the lighting fixture is installed. At 1200, the processor stores the sensed light level information as an initial light level value in non-volatile memory associated with the processor. At 1300, the processor again instructs the lighting element of the lighting fixture to illuminate. This instruction can occur at the predetermined time of day (i.e., the same time of day at which the initial light level value was obtained). In some embodiments this step will occur at a future date (i.e., at least the next day, week, month or year) as compared to the date the initial light level value was obtained. At 1400, the processor receives sensed light level information obtained by the light sensing element while the lighting element is illuminated. The sensed light level information can include a sensed light level value.

At 1500, the processor compares the sensed light level value to the initial light level value do determine if the sensed light level value deviates from the initial light level value by a predetermined amount. In some embodiments the predetermined amount comprises a percentage value based on the initial light level value. If the sensed light level value does not deviate from the initial light level value by a predetermined amount, then the process returns to step 1300 where, at the next scheduled interval (e.g., day, month, semi-annual, annual), the process repeats. If, however, the sensed light level value is determined to deviate from the initial light level value by a predetermined amount, then at 1600, an alert is transmitted. For embodiments in which the comparison step is performed by the lighting fixture processor, the alert may be transmitted to the room controller. For embodiments in which the comparison step is performed by the room controller processor, the alert may be transmitted by the room controller to a remote device (e.g., smart phone, smart tablet) via a wireless transceiver associated with the room controller.

Figure 5:
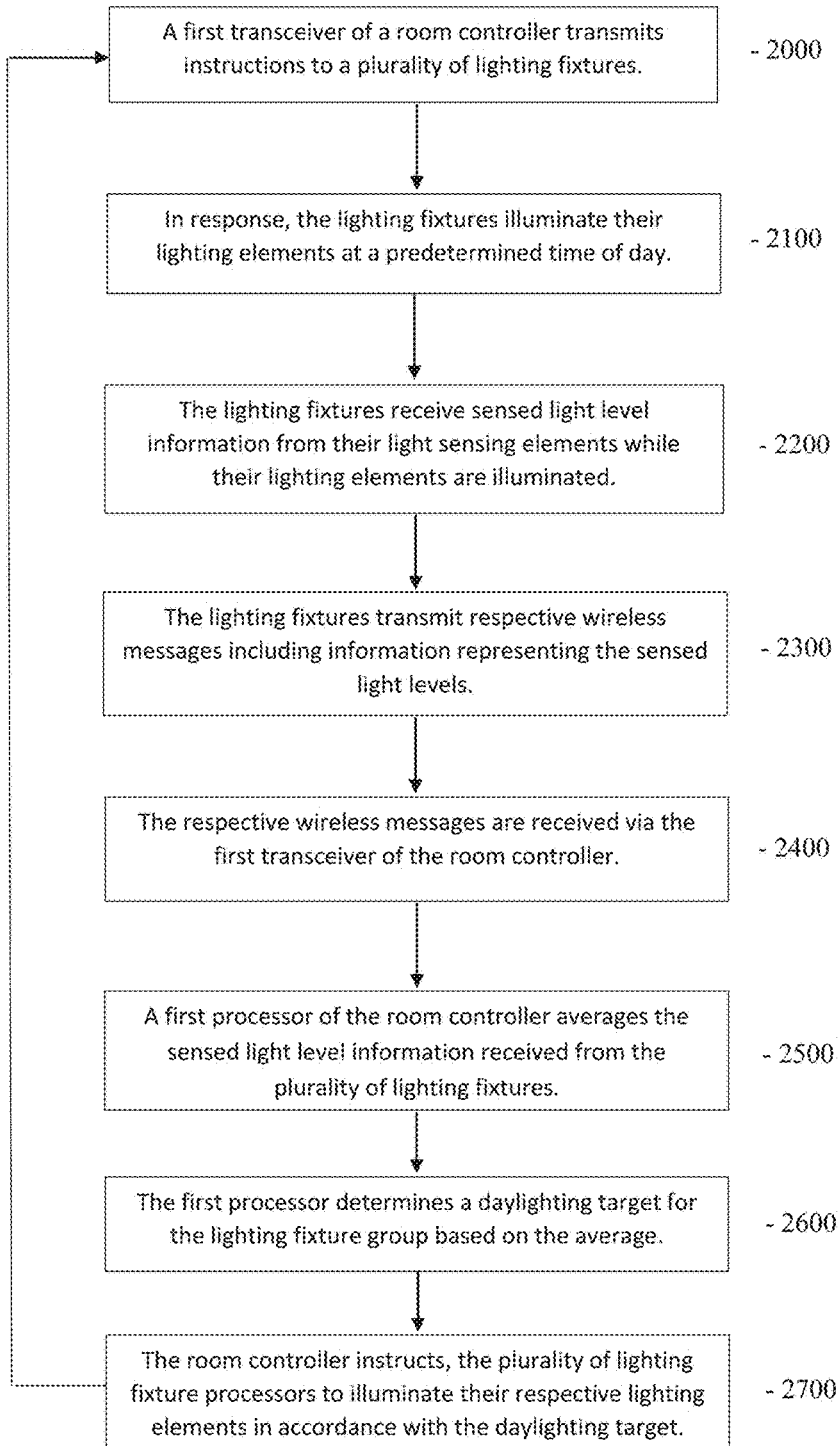
FIG. 5 is a logic diagram illustrating a second preferred embodiment of the disclosed method.

FIG. 5 is a logic diagram illustrating a second embodiment of the disclosed method relating to the setting of a daylighting target value. At 2000, a first transceiver of a room controller transmits instructions to a plurality of lighting fixtures. At 2100, In response to the instructions from the room controller, the lighting fixtures illuminate their lighting elements at a predetermined time of day. At 2200, the lighting fixtures receive sensed light level information from their light sensing elements while their lighting elements are illuminated. At 2300, the lighting fixtures transmit respective wireless messages including information representing the sensed light levels. At 2400, the respective wireless messages are received via the first transceiver of the room controller. At 2500, a first processor of the room controller averages the sensed light level information received from the plurality of lighting fixtures. At 2600, the first processor determines a daylighting target for the lighting fixture group based on the average. At 2700, the room controller instructs, the plurality of lighting fixture processors to illuminate their respective lighting elements in accordance with the daylighting target. For embodiments in which the method is performed on a periodic basis (e.g., daily, monthly) the method may then return to 2000.

Some embodiments of the disclosed may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. By way of example, such a machine may include, but not limited to, any suitable processing platform, computing platform, computing, processing, computing system, processing system, computer, processor, or the like, and may be implemented using any suitable combination of hardware and/or software. The computer-readable medium or article may include, but not limited to, any suitable type of memory unit, memory, memory article, memory medium, storage, storage article, storage medium and/or storage unit, for example, memory (including, but not limited to, non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. A system for adjusting a daylighting target for a lighting arrangement, comprising:
  a lighting fixture group comprising a plurality of lighting fixtures, each of said lighting fixtures in said lighting fixture group including: a housing, a lighting element, a light sensing element, a lighting fixture processor and a lighting fixture transceiver disposed within the housing;
  a room controller having a first processor and a first transceiver, the first processor programmed to:
    instruct, via the first transceiver, each of the plurality of lighting fixture processors to:
      illuminate their lighting elements at a predetermined time of day;
      receive sensed light level information from their light sensing elements while their lighting elements are illuminated; and transmit, via the lighting fixture transceiver, respective messages including information representing the sensed light level;

wherein the first processor is further programmed to receive, via the first transceiver, the respective messages and to determine a daylighting target, and instruct, via the first transceiver, the plurality of lighting fixture processors to illuminate their respective lighting elements in accordance with the daylighting target.

2. The system of claim 1, wherein the instruct step is performed periodically at the predetermined time based on clock information associated with the room controller.

3. The system of claim 2, wherein the first processor is configured to perform the instruct step at the predetermined time when the first processor determines, from the information representing the sensed light level, that the sensed light level for the lighting element of at least one of the plurality of light fixtures is less than a predetermined value.

4. The system of claim 1, wherein communication between the first transceiver of the room controller and each of the lighting fixture transceivers of the lighting fixture is via a wired connection.

5. The system of claim 4, wherein the wired connection is a wired digital connection.

6. The system of claim 4, wherein the wired connection is via one of an Ethernet cable, a Power over Ethernet cable, an RS485 cable, or a CAN cable.

7. A method for adjusting a daylighting target for a group of lighting fixtures, each of the lighting fixtures including a fixture processor, a lighting element, a light sensing element, and a fixture transceiver, the method comprising:

instructing, from a first transceiver of a room controller, the plurality of lighting fixtures to, one at a time:
  illuminate their lighting elements at a predetermined time of day;
  receive sensed light level information from their light sensing elements while their lighting elements are illuminated; and
  transmit, via their lighting fixture transceivers, respective messages including information representing the sensed light level;

receiving, via the first transceiver, the respective messages;

determining, by a first processor associated with the room controller, a daylighting target for the lighting fixture group; and instructing, via the first transceiver, the plurality of lighting fixture processors to illuminate their respective lighting elements in accordance with the daylighting target.

8. The method of claim 7, wherein the first transceiver instructs the plurality of lighting fixtures to perform said illuminate, receive and transmit steps periodically at the predetermined time based on clock information associated with the first processor.

9. The method of claim 8, wherein the first transceiver instructs the plurality of lighting fixtures to perform said illuminate, receive and transmit steps when the sensed light level for the lighting element of at least one of the plurality of light fixtures is determined to be less than a predetermined value.

10. The method of claim 7, wherein transmitting, via the lighting fixture transceivers, respective messages and receiving, via the first transceiver, the respective messages is performed by a wired connection.

11. The method of claim 10, wherein the wired connection is a wired digital connection.

12. The method of claim 10, wherein the wired connection is via one of an Ethernet cable, a Power over Ethernet cable, an RS485 cable, or a CAN cable.

13. The method of claim 10, further comprising: averaging, by the first processor associated with the room controller, the sensed light level information received from the plurality of lighting fixtures, wherein determining the daylighting target for the lighting fixture group is based on the average.

14. The system of claim 1, wherein the daylighting target is a daylighting target for the lighting fixture group based on the sensed light level information.

15. The system of claim 14, wherein the daylighting target for the lighting fixture group is based on an average of the sensed light level information.

* * * * *